United States Patent

Baughan et al.

[11] Patent Number: 5,718,411
[45] Date of Patent: Feb. 17, 1998

[54] ANTI-THEFT DEVICE FOR A SPARE TIRE CARRIER

[75] Inventors: Steven M. Baughan, Grand Blanc; Michael D. Via, Ortonville, both of Mich.

[73] Assignee: American Commercial Industries, Inc., Salem, Ohio

[21] Appl. No.: 475,943

[22] Filed: Jun. 7, 1995

[51] Int. Cl.[6] .................................................. B66D 5/32
[52] U.S. Cl. ........................ 254/323; 74/411.5; 188/31; 254/375
[58] Field of Search .......................... 254/375, 376, 254/323; 74/411.5; 192/4 A; 188/31, 69

[56] References Cited

U.S. PATENT DOCUMENTS

| | | | |
|---|---|---|---|
| 390,646 | 10/1888 | Brigel | 188/69 |
| 1,060,281 | 4/1913 | Oltmanns | 188/69 |
| 3,539,152 | 11/1970 | Paul | 254/323 |
| 3,899,852 | 8/1975 | Batson | 74/411.5 |
| 4,457,187 | 7/1984 | Tsuboi | 74/411.5 |
| 4,600,352 | 7/1986 | Ivan | 254/323 |
| 5,060,912 | 10/1991 | Guarr | 254/323 |
| 5,188,341 | 2/1993 | Greaves | 254/323 |
| 5,228,661 | 7/1993 | Bigham et al. | 254/323 |
| 5,314,288 | 5/1994 | Schmidt | 254/323 |

*Primary Examiner*—Katherine Matecki
*Attorney, Agent, or Firm*—Rader, Fishmaan & Grauer PLLC

[57] ABSTRACT

An anti-theft apparatus is disclosed for a spare tire lift-and-carry apparatus having intermeshing gears. The anti-theft apparatus includes a movable pin engageable with the intermeshing gears, such that when the pin is in a first position, movement of the intermeshing gears is prevented, and when the pin is in a second position, movement of the intermeshing gears is permitted. The pin is normally biased toward the first position. An actuating member is operably connected to the pin for moving the pin from the first position to the second position. Preferably, the actuating member is located within a secure area of the vehicle, such as a passenger compartment, a trunk, or a car jack storage area. A lock is provided on the actuating member for temporarily locking the pin in the second position.

17 Claims, 2 Drawing Sheets

5,718,411

ANTI-THEFT DEVICE FOR A SPARE TIRE CARRIER

FIELD OF THE INVENTION

The present invention relates to anti-theft devices for spare tire carriers and winches, sometimes referred to as tire lift-and-carry devices, which typically feature a cable-type winch or the like.

BACKGROUND OF THE INVENTION

The storage of a spare wheel in a vehicle has always been a problem. Designers have found it exceedingly difficult to mount the spare so as to make it accessible and easy to retrieve and replace. In an attempt to overcome these problems, devices have been proposed for mounting the spare wheel beneath the vehicle with an actuating mechanism connected to the winch accessible externally with respect to the vehicle to facilitate the vehicle operator's actuation of the winch in order to store or retrieve the spare tire. Due to the accessibility of the actuating mechanism for the winch from an external position with respect to the vehicle, unauthorized actuation of the winch has become an increasing problem.

SUMMARY OF THE INVENTION

The present invention seeks to reduce or eliminate the problems associated with providing easy external accessibility to the winch actuation mechanism for the spare tire carrier and storage device. The present invention seeks to prevent theft of the spare tire by providing a restricted access locking mechanism to prevent operation of the winch by anyone attempting to steal the spare tire. The apparatus according to the present invention includes a steel pin and coil spring. When attempting to lower the spare tire, the pin is forced into the meshing gears of the winch actuation mechanism, due to the biasing pressure of the spring on the steel pin, and prevents rotation of the gears. Pulling the pin away from the meshing gears, clear of the gear teeth, allows normal operation of the winch actuation mechanism. It is envisioned in the present invention that the steel pin will be activated from an area where access is restricted to the owner/operator of the vehicle. Activation can be accomplished by a cable attached to the pin, or any other suitable actuating mechanism, either manual or automated.

The present invention discloses an anti-theft apparatus for a spare tire lift-and-carry device having intermeshing gear means for use with a vehicle. The present invention includes a movable pin engageable with the intermeshing gear means such that when the pin is in a first position, movement of the intermeshing gear means is prevented, and when the pin is in a second position, movement of the intermeshing gear means is permitted. Biasing means is provided for urging the pin normally toward the first position. Pin actuating means moves the pin from the first position to the second position. The pin actuating means is preferably located within a secure position within the vehicle, such as the passenger compartment or a trunk, or jack storage compartment of the vehicle. Locking means is provided for temporarily locking the pin in the second position.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
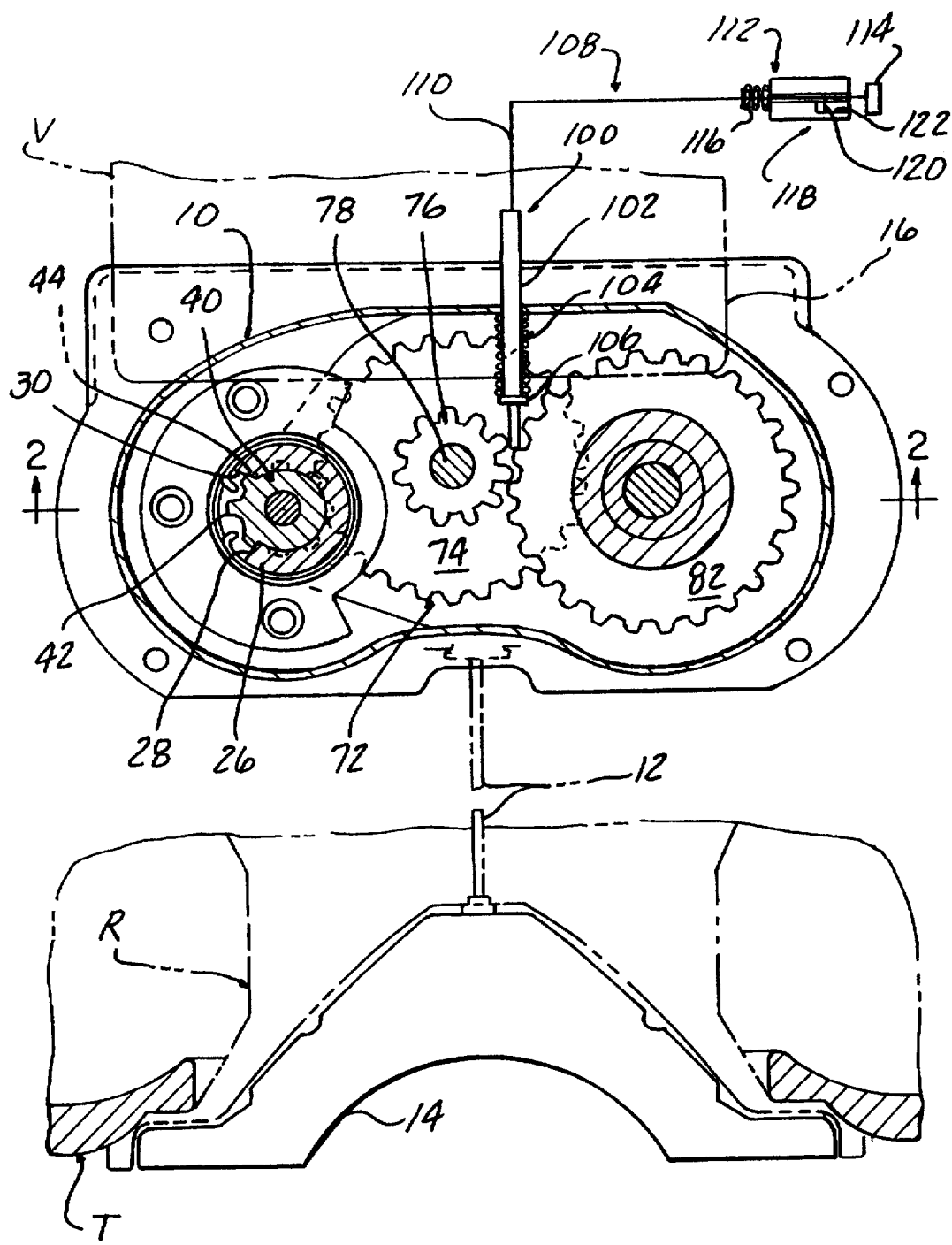
FIG. 1 is a side elevational view of a spare tire carrier and winch having an anti-theft apparatus according to the present invention with certain portions removed or cut away for clarity.

The present invention relates to an anti-theft apparatus for a spare tire lift-and-carry device having intermeshing gear means, such as that disclosed in U.S. Pat. No. 5,228,661 issued Jul. 20, 1993 which is incorporated herein by reference. Further details of the operation of a spare tire lift-and-carry device, or a similar device, can be obtained from the above-mentioned patent. By way of illustration, and not limitation, the present invention will be described with respect to the spare tire lift and carry device disclosed in U.S. Pat. No. 5,228,661, although other similar types of spare tire lift-and-carry devices having intermeshing gear means can be modified to incorporate the anti-theft apparatus according to the present invention. Referring now to FIG. 1, a typical spare tire lift-and-carry device is illustrated including housing means 10 having cable means 12 extending therefrom. The cable means 12 is attached to a rim retainer means 14. The rim retainer means 14 is engageable with a rim R and a tire T assembly including the spare wheel intended for storage beneath the vehicle. Mounting bracket means 16 is provided on the housing means 10 for attachment to a vehicle body portion V.

Figure 2:
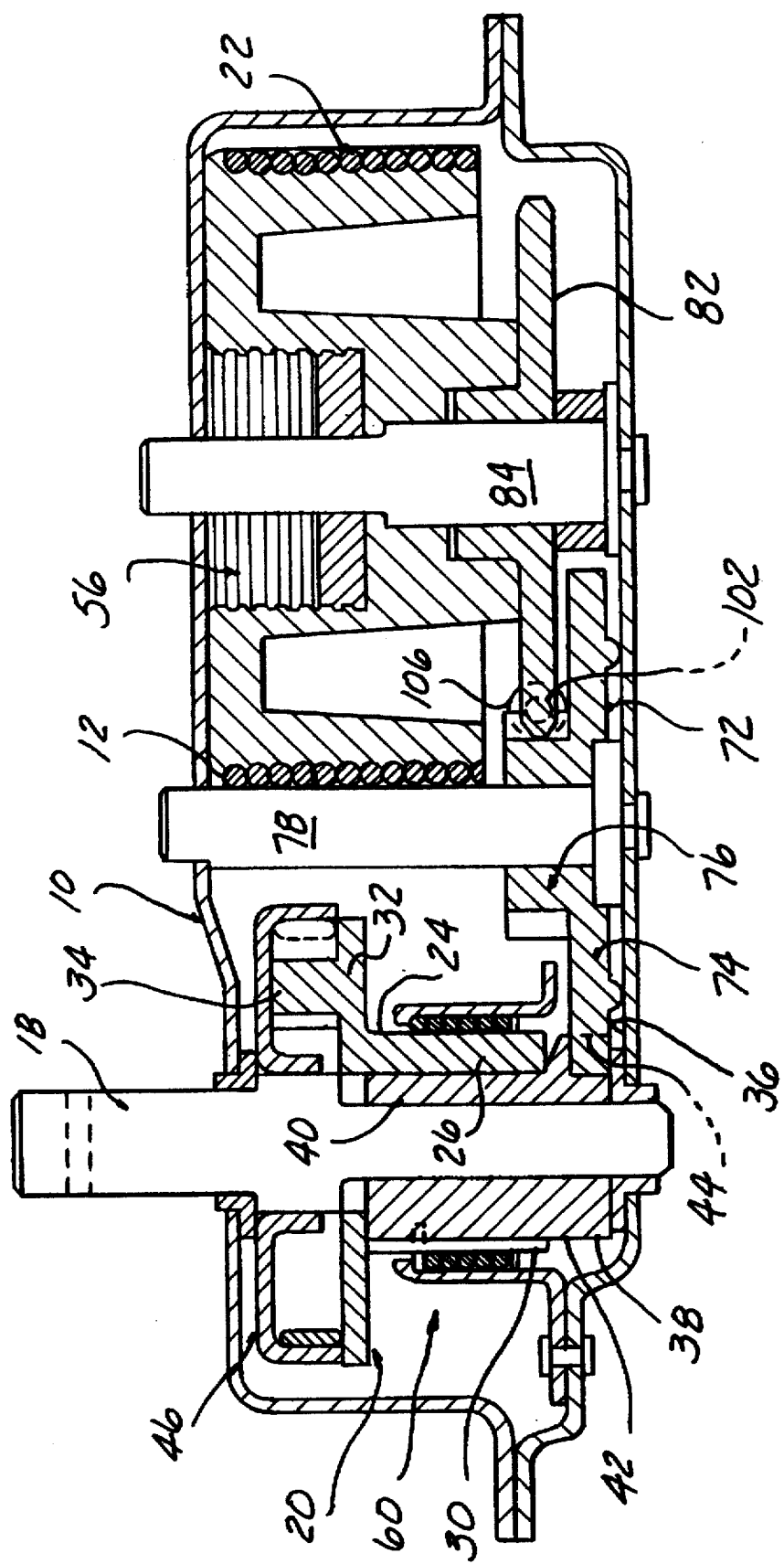
FIG. 2 is a cross-sectional view of the spare tire carrier and winch taken as shown in FIG. 1.

As best seen in FIG. 2 of the drawings, the typical spare tire lift-and-carry device includes input shaft means 18 disposed for rotation within the housing means 10 and having an external shaft portion adapted for engagement with drive means (not shown) of either the manual or automatic power type. The housing means 10 supports the input shaft means 18 for rotation about an axis of rotation. Torque transmission means 20 is connected to the input shaft means 18 for transmitting torque in subsequent rotation through the input shaft means 18 to a cable storage means 22. The cable storage means 22 is driven by the transmission means 20 for rotation about a longitudinal axis.

The transmission means 20 can include a first rotatable member 24 having a cylindrical portion 26 with a longitudinally extending slot formed in the cylindrical portion 26 defining generally opposing first and second sidewall faces 28 and 30, respectively. The first rotatable member 24 also includes an annular radially extending flange-like portion 32 generally disposed at one end of the cylindrical portion 26. The annular portion 32 includes a longitudinally extending projection 34 spaced radially from the longitudinal axis of the cylindrical portion 26. The projection 34 is adapted to engage a portion of the input shaft means 18 for rotation therewith. Intermeshing gear means 36 is driven by the first rotatable member 24 to impart rotation to the cable storage means 22. The intermeshing gear means 36 can include second rotatable member 38 having an elongated cylindrical portion 40 adapted to be received on a portion of the input shaft means 18 for rotation independent of the input shaft means 18. The elongated cylindrical portion 40 of the second rotatable member 38 is also adapted to be at least partially received within the cylindrical portion 26 of the first rotatable member 24. A radially extending projection 42 extends from the elongated cylindrical portion 40 of the second rotatable member 38 into the slot formed between the first and second sidewall faces 28 and 30, respectively, formed in the cylindrical portion 26 of the first rotatable member 24. The radially extending projection 42 may also extend longitudinally along the elongated cylindrical portion 40 of the second rotatable member 38. The second rotatable member 38 can include a pinion gear portion 44 disposed at one end of the elongated cylindrical portion 40 with the radially extending projection 42 formed by one longitudinally extending gear tooth along the entire longitudinal length of the elongated cylindrical portion 40.

The transmission means 20 can include torque override means 46. Clutch means 60 may also be provided for allowing the transmission of rotation in either direction when passing from the input shaft means 18 to the cable storage means 22, while preventing the transmission of rotation in either direction when passing from the cable storage means 22 to the input shaft means 18. Further details of the torque override means 46 and clutch means 60 can be obtained from U.S. Pat. No. 5,228,661.

Intermeshing gear means 36 is driven by the second rotatable member 38 to cause the cable storage means 22 to rotate in either rotational direction to thereby spool or unspool cable from the cable storage means 22. The present invention can be used with any direct drive gear means 36 for transferring rotational motion from the second rotatable member 38 to the cable storage means 32. The depicted gear means 36 preferably includes a cluster gear 72 having first and second gears 74 and 76, respectively, with common axes of rotation: preferably, the first gear 74 having a larger diameter than the second gear 76.

The cluster gear 72 is mounted for rotation on a stationary shaft or pin 78. The stationary shaft or pin 78 has a generally flat face portion disposed to act as a cable retainer to maintain the cable in position on the cable storage means 22. The first larger gear 74 of the cluster gear 72 is disposed in engagement with the pinion gear portion 44 of the second rotatable member 38. A spur gear 82 is disposed in engagement with the second smaller gear 76 of the cluster gear 72. The spur gear 82 is connected to the cable storage means 22 for imparting rotation thereto. As depicted, the spur gear 82 and cable storage means 22 have common axes of rotation and are supported on a second stationary shaft or pin 84.

The cable storage means 22 can include stop means 56 for preventing further rotation of the cable storage means 22 beyond a point of full cable deployment, or beyond a point of full cable retraction. Details of the stop means 56 can be obtained from U.S. Pat. No. 5,228,661.

The anti-theft apparatus 100 according to the present invention prevents unauthorized operation of a spare tire lift-and-carry device. The spare tire lift-and-carry device preferably includes intermeshing gear means 36 to impart rotation to the cable storage means 22. The anti-theft apparatus 100 includes a movable pin 102 engageable with the intermeshing gear means 36, such that when the pin 102 is in a first position, movement of the intermeshing gear means 36 is prevented, and when the pin 102 is in a second position, movement of the intermeshing gear means 36 is permitted. The pin 102 has a cross-section of sufficient size to preferably move into obstructive engagement between the intermeshing teeth of second gear 76 and spur gear 82 as illustrated in FIG. 1. Biasing means 104, such as a compression spring, is provided for urging the pin 102 toward the first position preventing relative movement between second gear 76 and spur gear 82. The biasing means 104 can be conveniently interposed between a wall of the housing means 10 and an outwardly extending annular flange 106 formed on the pin 102 spaced longitudinally from the end engaging the intermeshing teeth of the second gear 76 and spur gear 82. Pin actuating means 108 is provided for moving the pin 102 from the first position to the second position. Preferably, the pin actuating means 108 is located within a secured portion of the vehicle, such as a passenger compartment, a trunk, a car jack storage area or the like. The pin actuating means 108 can include a cable 110 extending from an end of the pin 102 opposite from the end obstructively engaging the intermeshing teeth of the gear means 36. The elongated cable 110 can be connected at an opposite end to a manual or automated switch. A manual switch 112 is illustrated having a pull knob 114 to move the pin 102 from the first position to the second position to allow operative intermeshing engagement between second gear 76 and spur gear 82. The pull knob 114 is normally biased, such as by compression spring 116 toward a non-actuated position. The switch 112 also preferably includes locking means for temporarily locking the pin 102 in the second position during authorized operation of the intermeshing gear means 36. The locking means 118 can include a projection 120 extending radially from the shaft of the pull knob 114 within a slot 122 while in the non-actuating position. When the pull knob 114 is pulled radially outwardly and rotated to move the projection 120 out of alignment with the slot 122, the pin 102 is held in the second position.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An anti-theft apparatus for a spare tire lift and carry apparatus having intermeshing gears for use in a vehicle comprising:

a housing for enclosing said intermeshing gears, said housing having at least one outermost stationary wall;

a moveable pin selectively engageable with said intermeshing gears, such that when said pin is in a first position, movement of said intermeshing gears is prevented, and when said pin is in a second position, movement of said intermeshing gears is permitted, said pin passing through said outermost stationary wall of said housing so as to extend from inside said housing to outside said housing; and a biasing element for urging said pin normally toward said first position, said biasing element connected to said outermost stationary wall at one end and connected to said pin at an opposite end to normally bias said pin toward said first position into obstructive contact of said one end with said intermeshing gears to prevent relative intermeshing movement thereof.

2. The apparatus of claim 1 further comprising:

a pin actuator for selectively moving said pin from said first position to said second position.

3. The apparatus of claim 2 further comprising:

said pin actuator located within a secure area of said vehicle for remotely moving said pin.

4. The apparatus of claim 1 further comprising:

a locking element for temporarily securing said pin in said second position.

5. The apparatus of claim 1 further comprising:

a pin actuator for remotely moving said pin from said first position to said second position; and a locking element for temporarily securing said pin in said second position.

6. The apparatus of claim 1 further comprising:

said pin having an outwardly extending flange formed spaced longitudinally from one end thereof, said flange being disposed internally within said housing; and said biasing element including a compression spring connected to said outermost stationary wall at one end and connected to said flange at an opposite end.

7. An anti-theft apparatus for a spare tire lift and carry apparatus having intermeshing gears for use in a vehicle comprising:

a housing for enclosing said intermeshing gears, said housing having at least one outermost stationary wall;

a moveable pin engageable with said intermeshing gears, such that when said pin is in a first position, movement of said intermeshing gears is prevented, and when said pin is in a second position, movement of said intermeshing gears is permitted, said pin passing through said outermost stationary wall of said housing so as to extend from inside said housing to outside said housing;

a spring for urging said pin normally toward said first position; and a pin actuator for selectively moving said pin from said first position to said second position.

8. The apparatus of claim 7 further comprising:

said pin actuator located within a secure area of said vehicle for remotely moving said pin.

9. The apparatus of claim 7 further comprising:

a locking element for temporarily securing said pin in said second position.

10. The apparatus of claim 7 further comprising:

said pin having an outwardly extending flange formed spaced longitudinally from one end thereof, said flange being disposed internally within said housing; and said spring connected in compression between said outermost stationary wall at one end and said flange at an opposite end to normally bias said pin toward said first position into obstructive contact of said one end with said intermeshing gears to prevent relative intermeshing movement thereof.

11. In a spare tire lift and carry apparatus having intermeshing gears for use in a vehicle, the improvement of an anti-theft apparatus comprising:

a housing for enclosing said intermeshing gears, said housing having at least one outermost stationary wall;

a moveable pin engageable with said intermeshing gears, such that when said pin is in a first position, movement of said intermeshing gears, is prevented, and when said pin is in a second position, movement of said intermeshing gears, is permitted, said pin passing through said outermost stationary wall of said housing so as to extend from inside said housing to outside said housing; and a pin actuator for selectively moving said pin from said first position to said second position.

12. The apparatus of claim 11 further comprising:

a biasing element for urging said pin normally toward said first position.

13. The apparatus of claim 11 further comprising:

said pin actuator located within a secure area of said vehicle for remotely moving said pin.

14. The apparatus of claim 11 further comprising:

a locking element for temporarily securing said pin in said second position.

15. The apparatus of claim 11 further comprising:

a biasing element for urging said pin normally toward said first position; and a locking element for temporarily securing said pin in said second position.

16. The apparatus of claim 11 further comprising:

said pin having an outwardly extending flange formed spaced longitudinally from one end thereof, said flange being disposed internally within said housing; and a biasing element including a compression spring connected to said outermost stationary wall at one end and connected to said flange at an opposite end to normally bias said pin toward said first position into obstructive contact of said one end with said intermeshing gears to prevent relative intermeshing movement thereof.

17. In a spare tire lift and carry apparatus having intermeshing gears for use in a vehicle, the improvement of an anti-theft apparatus comprising:

a moveable pin engageable with said intermeshing gears, such that when said pin is in a first position, movement of said intermeshing gears is prevented, and when said pin is in a second position, movement of said intermeshing gears is permitted;

said spare tire lift and carry apparatus having a housing for enclosing said intermeshing gears, said housing having at least one stationary wall;

said pin having an outwardly extending flange formed spaced longitudinally from one end thereof, said pin passing through said stationary wall of said housing with said flange disposed internally within said housing; and a biasing element including a compression spring connected to said stationary wall at one end and connected to said flange at an opposite end to normally bias said pin toward said first position into obstructive contact of said one end with said intermeshing gears to prevent relative intermeshing movement thereof.

\* \* \* \* \*